US012187176B1

(12) United States Patent
Warner

(10) Patent No.: US 12,187,176 B1
(45) Date of Patent: Jan. 7, 2025

(54) FRAME FOR MODULAR TRAILER CONVERSION UNIT AND MODULAR TRAILER CONVERSION SYSTEM

(71) Applicant: Steelhouse Fabrication, LLC, Albuquerque, NM (US)

(72) Inventor: Tristen Warner, Albuquerque, NM (US)

(73) Assignee: Steelhouse Fabrication, LLC, Albuquerque, NM (US)

( * ) Notice: Subject to any disclaimer, the term of this patent is extended or adjusted under 35 U.S.C. 154(b) by 647 days.

(21) Appl. No.: 17/482,505

(22) Filed: Sep. 23, 2021

Related U.S. Application Data

(60) Provisional application No. 63/083,883, filed on Sep. 26, 2020.

(51) Int. Cl.
*B60P 3/39* (2006.01)
*B60P 3/34* (2006.01)
*B62D 63/08* (2006.01)

(52) U.S. Cl.
CPC *B60P 3/39* (2013.01); *B60P 3/34* (2013.01); *B62D 63/08* (2013.01)

(58) Field of Classification Search
CPC .. B60P 7/0815; B60P 3/39; B60P 3/34; B62D 63/08
USPC ....... 410/104, 105, 115, 144, 150, 130, 145, 410/146, 147, 148, 149, 8
See application file for complete search history.

(56) References Cited

U.S. PATENT DOCUMENTS 4,702,653 A * 10/1987 Gaulding .................. B60P 7/15 410/152
6,270,137 B1 * 8/2001 Minix ....................... B60P 3/36 312/246
6,497,442 B1 * 12/2002 Wacker ..................... B60P 3/14 296/24.32
6,675,980 B2 1/2004 Ehrgott
8,414,046 B2 * 4/2013 Pencak ..................... B60R 5/04 296/24.44
11,833,955 B1 * 12/2023 Sullivan ............... B60N 2/3095
2005/0074310 A1 * 4/2005 Davies .................. B60P 7/0823 410/141

FOREIGN PATENT DOCUMENTS

EP 1894774 A1 * 3/2008 ............ B60P 7/0815

* cited by examiner

*Primary Examiner* — Joseph D. Pape
(74) *Attorney, Agent, or Firm* — Sisson & Banyas, Attorneys at Law, LLC; Jeffrey J. Banyas

(57) ABSTRACT

Described herein is a modular system for converting at least a portion of a trailer to a living quarters. The system may comprise at least one frame, at least one cargo control track comprising at least one receiving member receptacle, at least one attachment mechanism configured to connect the at least one frame to the at least one cargo control track at the at least one receiving member receptacle, and at least one living quarters module. The at least one living quarters module may be selected from a sink module, a storage cabinet module, a bed module, a stove module, a toilet module, and a shower module. Each living quarters module may be connected to one of the at least one frame.

20 Claims, 15 Drawing Sheets

FRAME FOR MODULAR TRAILER CONVERSION UNIT AND MODULAR TRAILER CONVERSION SYSTEM

CROSS REFERENCES AND PRIORITIES

This application claims priority from U.S. Provisional Application No. 63/083,883 filed on 26 Sep. 2020, the teachings of which are incorporated by reference herein in their entirety.

BACKGROUND

Trailers which are towed behind trucks, vans, or other vehicles come in many different varieties. One variety of trailer is an enclosed cargo trailer which—in general—comprises a floor having one or more axle and wheel assemblies connected to a bottom surface thereof, at least four exterior walls extending upward from the perimeter of the floor, and a roof opposite of the floor. The enclosed space between the floor, the roof, and the exterior walls generally remains empty and can be filled with any number of objects such as vehicles, product shipments, or landscaping equipment for transport from one location to another.

Another variety of trailer is a recreational vehicle. While recreational vehicles also have a floor, roof, and at least four exterior walls, the enclosed space between the floor, the roof, and exterior walls may be filled with any number of living amenities. Common living amenities found within a recreational vehicle include beds, couches, tables, sinks, toilets, showers, refrigerators, and cooking apparatus such as stoves, ovens, and microwaves.

In certain situations, an enclosed cargo trailer may be utilized for providing temporary housing for one or more occupants. Such may occur when the trailer user wishes to have living amenities while also maintaining a portion of the enclosed cargo trailer for transporting objects. This may also occur when the trailer user wishes to use the enclosed cargo trailer for transporting objects at certain times, and for temporary housing at other times.

Attempts have been made to convert enclosed cargo trailers into recreational vehicles. However, previous attempts have traditionally relied on permanently mounting fixtures for beds, couches, tables, sinks, toilets, showers, refrigerators, and cooking apparatus within the enclosed cargo trailer using bolts, screws, adhesives, welding, or other fasteners. This limits the ability of the trailer user to convert the enclosed cargo trailer from cargo transportation use to recreational vehicle use; and further limits the ability to move different fixtures within the enclosed cargo trailer, or add or remove fixtures depending on their immediate needs.

The need exists, therefore, for an apparatus and system for non-permanently converting an enclosed cargo trailer to a recreational vehicle by adding one or more fixtures into the enclosed area of the cargo trailer.

SUMMARY

A frame for a modular trailer conversion unit is disclosed. The frame comprises a base, a plurality of legs, an upper frame section, and at least one attachment mechanism. The base may comprise at least a first rigid base member, a second rigid base member, and a third rigid base member. The plurality of legs may comprise at least a first rigid leg member, and a second rigid leg member. The upper frame section may comprise at least a first rigid upper frame section member, a second rigid upper frame section member, and a third rigid upper frame section member. The at least one attachment mechanism may comprise an upper resilient finger adjacent to an upper notch, a lower resilient finger adjacent to a lower notch, and a flange.

The first rigid leg member may be connected to and extend upwardly from the base originating at a first juncture point between the first rigid base member and the second rigid base member. The second rigid leg member may be connected to and extend upwardly from the base originating at a second juncture point between the second rigid base member and the third rigid base member.

The first rigid upper frame section member may be connected to and extend perpendicular from the first rigid leg member in a first plane substantially parallel with the first rigid base member. The second rigid upper frame section member may be connected to and extend between the first rigid leg member and the second rigid leg member in a second plane substantially parallel with the second rigid base member. The third rigid upper frame section member may be connected to and extend perpendicular from the second rigid leg member in a third plane substantially parallel with the third rigid base member.

At least one of the second rigid base member, the first rigid leg member, the second rigid leg member, and the second rigid upper frame section member may comprise at least one through hole passing through the respective member. A mounting flange may extend from the flange in a direction opposite the upper resilient finger and the lower resilient finger. Each attachment mechanism of the at least one attachment mechanism may be connected to the frame by a fastener passing through the mounting flange and the at least one through hole. The at least one attachment mechanism may be configured to removably attach to a receiving member receptacle of a cargo control track. The cargo control track may be configured to connect to an interior wall, floor, and/or ceiling of a trailer.

In some embodiments, the frame may further comprise a third rigid leg member. The third rigid leg member may be connected to and extend upwardly from the base originating at an end of the first rigid base member opposite the first juncture point. In certain embodiments, the frame may further comprise a fourth rigid leg member. The fourth rigid leg member may be connected to and extend upwardly from the base originating at an end of the second rigid base member opposite the second juncture point.

In certain embodiments, the base may further comprise a fourth rigid base member. In some embodiments, the upper frame section may further comprise a fourth rigid upper frame section member.

In some embodiments, the frame may further comprise a countertop connected to the upper frame section. The countertop may further comprise at least one sink basin and a faucet. The faucet may be fluidly connected to a sink water pump. The wink water pump may be fluidly connected to a sink fresh water source. The sink basin may comprise a sink drain which may be fluidly connected to a sink waste water tank.

In certain embodiments, the sink water pump may be electrically connected to a power source. The power source may provide a source of electricity for powering the sink water pump. In some embodiments, the power source may be electrically connected to the sink water pump through an inverter. In certain embodiments, the power source may be a battery. In some embodiments, the power source may be configured to electrically connect to a solar panel. The solar panel may be capable of providing a source of electricity for recharging the power source.

In some embodiments, the frame may further comprise a backstop. The backstop may comprise a first rigid backstop member, a second rigid backstop member, a third rigid backstop member, and a backstop panel disposed over or within a void defined by the first rigid backstop member, the second rigid backstop member, the third rigid backstop member, and the second rigid upper frame section member.

In certain embodiments, the frame may further comprise a storage cabinet. The storage cabinet may be located within an interior of the frame.

In some embodiments, the countertop may further comprise at least one stovetop. The at least one stovetop may comprise at least a first stove burner fluidly connected to a fuel source. The fuel source may be a tank containing liquefied petroleum gas (LPG).

In certain embodiments, the at least one stovetop may further comprise at least a second stove burner fluidly connected to the fuel source. In some embodiments, the at least one stovetop may further comprise at least a third stove burner fluidly connected to the fuel source, and a fourth stove burner fluidly connected to the fuel source.

In some embodiments, the frame may further comprise a bed frame of substantially rectangular construction. The bed frame may comprise at least a first bed frame leg and a second bed frame leg. In certain embodiments where the frame comprises a third rigid leg member and a fourth rigid leg member, the bed frame may be pivotably connected to each of the third rigid leg member and the fourth rigid leg member. In some embodiments, the bed frame may further comprise a mattress.

In certain embodiments, the frame may further comprise a toilet connected to the frame. The toilet may be fluidly connected to a toilet water pump. The toilet water pump may be fluidly connected to a toilet fresh water source. The toilet may comprise a toilet drain, which may be fluidly connected to a toilet waste water tank.

In some embodiments, the toilet water pump may be electrically connected to a power source. The power source may provide a source of electricity for powering the toilet water pump. In certain embodiments, the power source may be electrically connected to the toilet water pump through an inverter. In some embodiments, the power source may be a battery. In certain embodiments, the power source may be configured to electrically connect to a solar panel. The solar panel may be capable of providing a source of electricity for recharging the power source.

In certain embodiments, the frame may further comprise a shower connected to the frame. The shower may fluidly connected to a shower water pump. The shower water pump may be fluidly connected to a shower fresh water source. The shower may comprise a shower drain, which may be fluidly connected to a shower waste water tank.

In some embodiments, the shower water pump may be electrically connected to a power source. The power source may provide a source of electricity for powering the shower water pump. In certain embodiments, the power source may be electrically connected to the shower water pump through an inverter. In some embodiments, the power source may be a battery. In certain embodiments, the power source may be configured to electrically connect to a solar panel. The solar panel may be capable of providing a source of electricity for recharging the power source.

In certain embodiments, the frame may further comprise a couch connected to the frame. The couch may comprise at least a first couch leg.

In some embodiments, the frame may further comprise a dinette connected to the frame. The dinette may comprise at least a first dinette bench and a dinette table.

A modular system for converting at least a portion of a trailer to a living quarters is also disclosed. The modular system may comprise at least one frame, at least one cargo control track, at least one attachment mechanism, and at least one living quarters module. The at least one living quarters module may be selected from the group consisting of a sink module, a storage cabinet module, a bed module, a stove module, a toilet module, a shower module, a combined stove and sink module, a combined toilet and shower module, a seating module, and a dinette module. Each living quarters module may be connected to one of the at least one frame.

The at least one cargo control track may comprise at least one receiving member receptacle. The at least one attachment mechanism may be configured to connect the at least one frame to the at least one cargo control track at the at least one receiving member receptacle.

DETAILED DESCRIPTION

Disclosed herein is a frame for a modular trailer conversion unit. Also disclosed herein is a modular system for converting at least a portion of a trailer to a living quarters. The frame and modular system are described below with reference to the Figures. As described herein and in the claims, the following numbers refer to the following structures as noted in the Figures.

5 refers to a trailer.
10 refers to a modular trailer conversion unit.
100 refers to a frame.
110 refers to a base.
111 refers to a first rigid base member.
112 refers to a second rigid base member.
113 refers to a third rigid base member.
114 refers to a fourth rigid base member.
115 refers to a first juncture point.
116 refers to a second juncture point.
120 refers to legs.
121 refers to a first rigid leg member.
122 refers to a second rigid leg member.
123 refers to a third rigid leg member.
124 refers to a fourth rigid leg member.
130 refers to an upper frame section.
131 refers to a first rigid upper frame section member.
132 refers to a second rigid upper frame section member.
133 refers to a third rigid upper frame section member.
134 refers to a fourth rigid upper frame section member.
135 refers to a through hole.
140 refers to an attachment mechanism.
141 refers to an mounting flange.
142 refers to an upper resilient finger.
143 refers to a fastener
144 refers to an upper notch.
146 refers to a lower resilient finger.
148 refers to a lower notch.
149 refers to a flange.
200 refers to a cargo control track.
210 refers to a receiving member receptacle.
300 refers to a countertop.
310 refers to a sink basin.
315 refers to a sink drain.
320 refers to a faucet.
330 refers to a sink water pump.
340 refers to a sink fresh water source.
350 refers to a sink waste water tank.
360 refers to a solar panel.
362 refers to a battery.
362 refers to an inverter.
370 refers to a backstop.
371 refers to a first rigid backstop member.
372 refers to a second rigid backstop member.
373 refers to a third rigid backstop member.
380 refers to a storage cabinet.
400 refers to a bed frame.
410 refers to a first bed frame leg.
420 refers to a second bed frame leg.
430 refers to a mattress.
500 refers to a stovetop.
510 refers to a first stove burner.
520 refers to a second stove burner.
550 refers to a fuel source.
600 refers to a toilet.
610 refers to a toilet water pump.
620 refers to a toilet fresh water source.
630 refers to a toilet drain.
640 refers to a toilet waste water tank.
700 refers to a shower.
710 refers to a shower water pump.
720 refers to a shower fresh water source.
730 refers to a shower drain.
740 refers to a shower waste water tank.
800 refers to a couch.
810 refers to a couch leg.
900 refers to a dinette.
910 refers to a dinette first bench.
920 refers to a dinette second bench.
930 refers to a dinette table.

Figure 1:
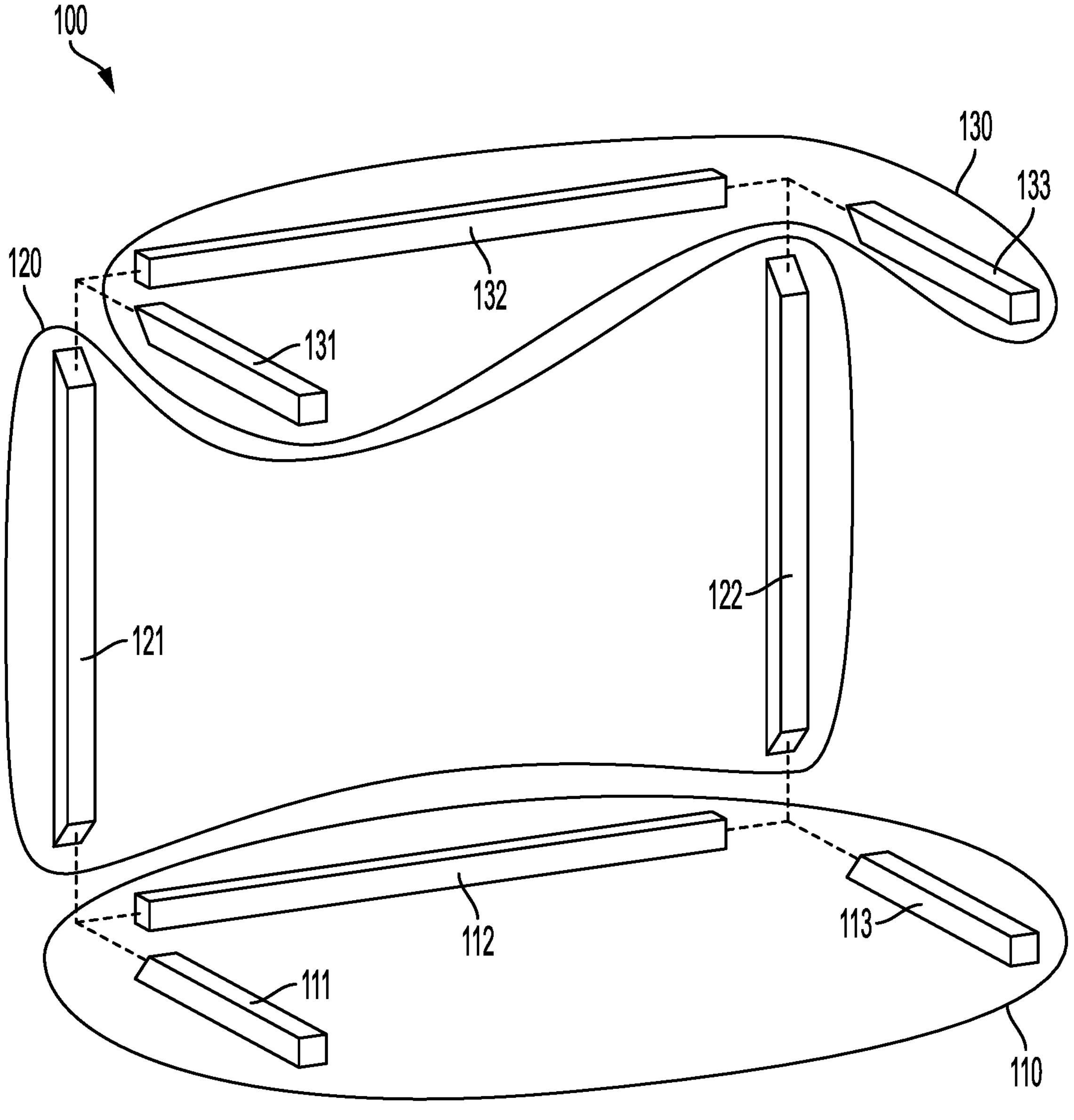
FIG. 1 depicts an exploded perspective view of one embodiment of a frame for a modular trailer conversion unit.

FIG. 1 depicts an exploded perspective view of one embodiment of a frame (100) for a module trailer conversion unit (10 as shown in FIG. 6 through FIG. 13). As shown in FIG. 1, the frame may comprise a base (110), a plurality of legs (120), and an upper frame section (130).

Figure 2:
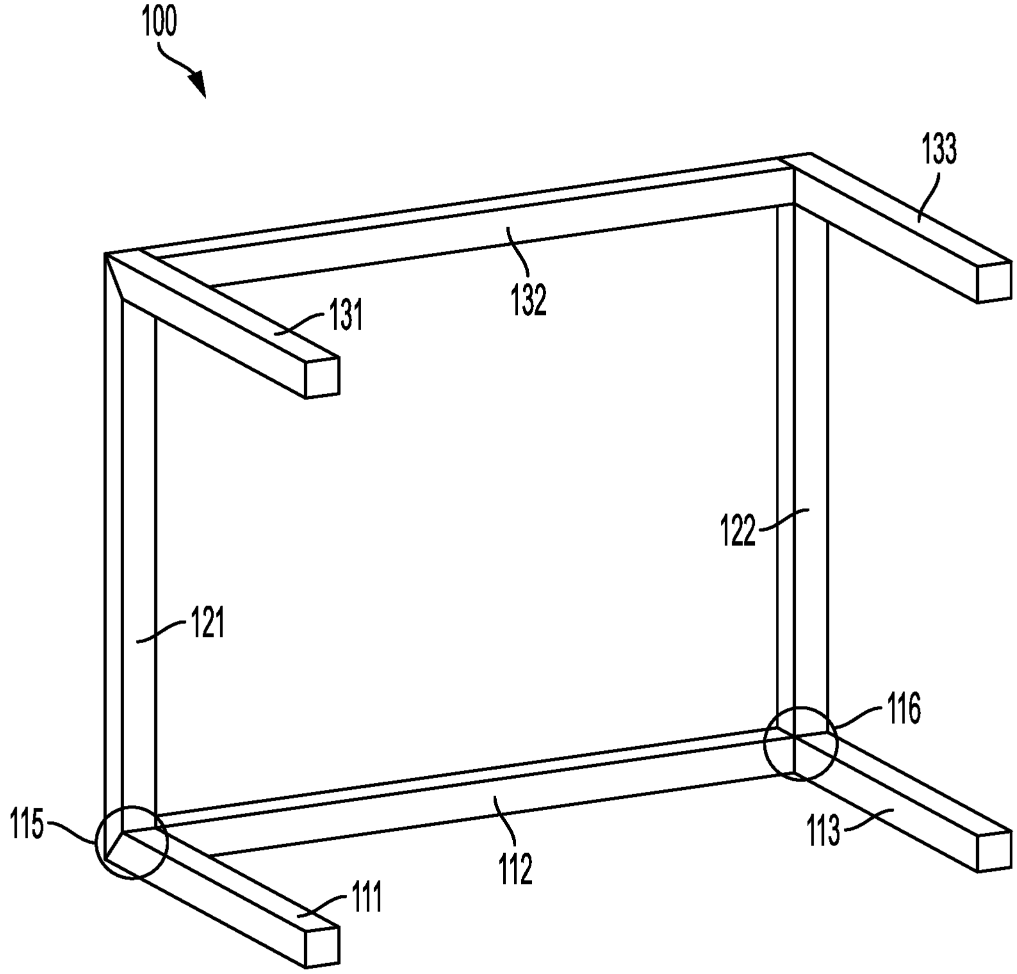
FIG. 2 depicts an assembled perspective view of the embodiment of a frame for a modular trailer conversion unit of FIG. 1.

The base (110) may comprise at least a first rigid base member (111), a second rigid base member (112), and a third rigid base member (113). When assembled (as shown in FIG. 2), the first rigid base member is connected to and extends substantially perpendicular from or perpendicular from a first end of the second rigid base member. The point at which the first rigid base member connects to the second rigid base member may be referred to as a first juncture point (115 as shown in FIG. 2). The third rigid base member is connected to and extends substantially perpendicular from or perpendicular from a second end of the second rigid base member which is opposite of the first end of the second rigid base member. The point at which the third rigid base member connects to the second rigid base member may be referred to as a second juncture point (116 as shown in FIG. 2).

Figure 3:
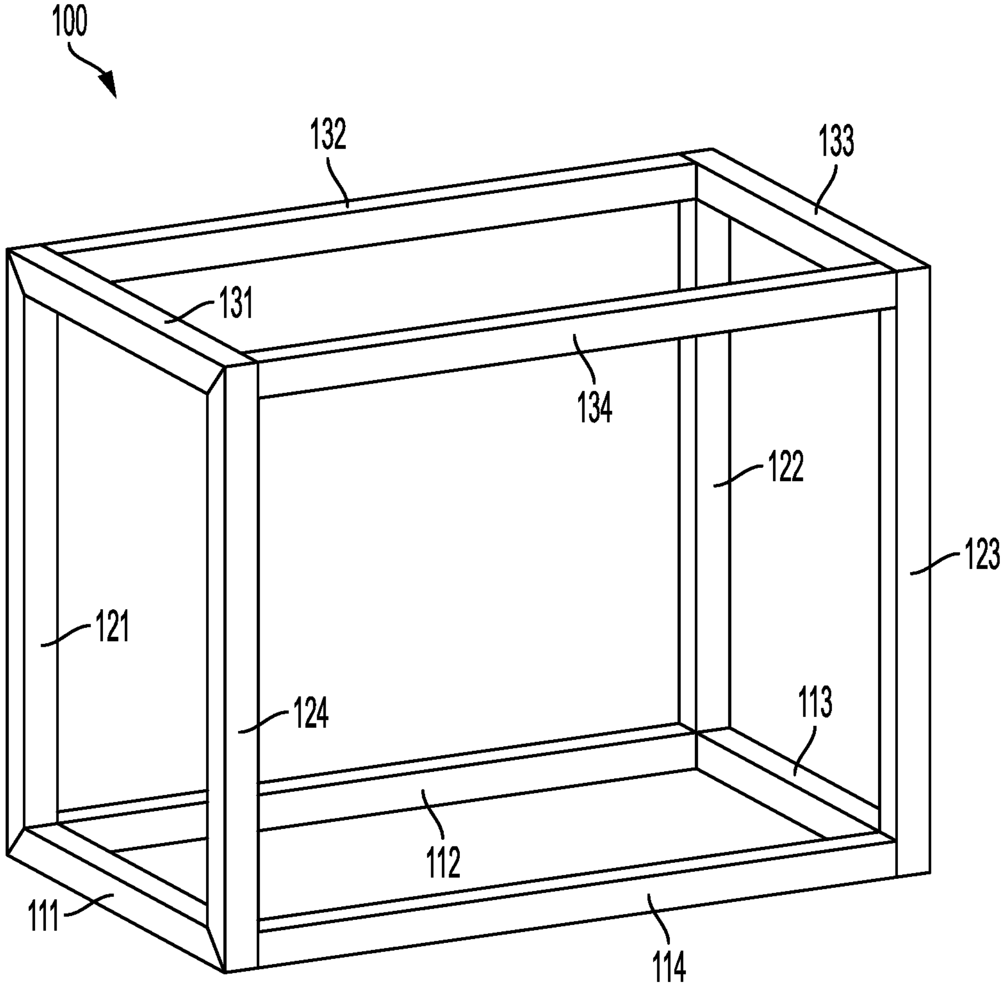
FIG. 3 depicts an assembled perspective view of an alternative embodiment of a frame for a modular trailer conversion unit.

The plurality of legs (120) may comprise at least a first rigid leg member (121) and a second rigid leg member (122). When assembled (as shown in FIG. 2), the first rigid leg member is connected to and extends upwardly from the base originating at the first juncture point (115) while the second rigid leg member is connected to and extends upwardly from the base originating at the second juncture point (116). In some embodiments, the plurality of legs may further comprise a third rigid leg member (123 as shown in FIG. 3) which may be connected to and extend upwardly from the base originating at an end of the first rigid base member (111) opposite the first juncture point. In still other embodiments, the plurality of legs may further comprise a fourth rigid leg member (124 as shown in FIG. 3) which may be connected to and extend upwardly from the base originating at an end of the third rigid base member (113) opposite the second juncture point.

The upper frame section (130) may comprise at least a first rigid upper frame section member (131), a second rigid upper frame section member (132) and a third rigid upper frame section member (133). When assembled (as shown in FIG. 2), the first rigid upper frame section member is connected to and extends substantially perpendicular from or perpendicular from the first rigid leg (121) member in a first plane substantially parallel with or parallel with the first rigid base member (111). The second rigid upper frame section member is connected to and extends between the first rigid leg member and the second rigid leg member (122) in a second plane substantially parallel with the second rigid base member (112). The third rigid upper frame section member is connected to and extends substantially perpendicular from or perpendicular from the second rigid leg member in a third plane substantially parallel with the third rigid base member.

Viewed from above, the frame (100) shown in FIG. 1 and FIG. 2 generally forms a "C" shape. While such a frame shape may be useful in some applications, other shapes may be possible. One such other shape is shown in FIG. 3 and may be considered a parallelogram shape.

In the embodiment shown in FIG. 3, the frame (100) comprises both a third rigid leg member (123) as described herein, and a fourth rigid leg member (124) as described herein. The frame in FIG. 3 may also comprise a fourth rigid base member (114). As shown in FIG. 3, when present, the fourth rigid base member may extend between the first rigid base member (111) and the third rigid base member (113) at an end opposite of the second rigid base member (112). In some embodiments, such as that shown in FIG. 3, the frame may also comprise a fourth rigid upper frame section member (134). As shown in FIG. 3, when present, the fourth rigid upper frame section member may extend between the first rigid upper frame section member (131) and the third rigid upper frame section member (133) at an end opposite of the second rigid upper frame section member (132).

The rigid base members (111, 112, 113, 114), rigid leg member (121, 122, 123, 124), and rigid upper frame section member (131, 132, 133, 134) which make up the frame (100) may be fabricated of any rigid materials. Preferred rigid materials include metals, woods, and rigid plastic. Nonlimiting examples of metals include steel, stainless steel, aluminum, and titanium. Nonlimiting examples of rigid plastics may include high-density polyethylene (HDPE), rigid polyesters such as polyethylene terephthalate (PET) and polyethylene naphthalate (PEN), and rigid polyamides such as nylon.

The rigid base members (111, 112, 113, 114), rigid leg member (121, 122, 123, 124), and rigid upper frame section member (131, 132, 133, 134) which make up the frame (100) may be connected to one another by any conventional means. In general, the connection may be either a permanent connection or a nonpermanent connection. Nonlimiting examples of permanent connections include welding one member to another, or manufacturing two or more members of a single integral pieces of material, such as by injection molding or extrusion molding. Nonlimiting examples of nonpermanent connections include threading one member into another or connecting one member to another using a fastener such as a bolt, screw, or rivet.

In certain embodiments, the frame may also comprise one or more panels. Each panel may be designed to partially or completely fill the void created by the perimeter formed by the rigid members of the frame. One example of a panel may be a floor panel which partially or completely fills the void created by the perimeter formed by the rigid members of the base (110). Another example of a panel may be a top panel which partially or completely fills the void created by the perimeter formed by the rigid members of the upper frame section (130).

Another type of panel is a wall panel. One type of wall panel may be a front wall panel which partially or completely fills the void created by the perimeter formed by the fourth rigid base member (114), the fourth rigid leg member (124), the fourth rigid upper frame section member (134), and the third rigid leg member (123). Another type of wall panel may be a first side wall panel which partially or completely fills the void created by the perimeter formed by the first rigid base member (111), the first rigid leg member (121), the first rigid upper frame section member (131), and the fourth rigid leg member (124). Yet another type of wall panel may be a rear wall panel which partially or completely fills the void created by the perimeter formed by the second rigid base member (112), the first rigid leg member (121), the second rigid upper frame section member (132), and the second rigid leg member (122). Still another type of wall panel may be a second side wall panel which partially or completely fills the void created by the perimeter formed by the third rigid base member (113), the second rigid leg member (122), the third rigid upper frame section member (133), and the third rigid leg member (123).

For any given frame, the frame may comprise at least one panel selected from the group consisting of a floor panel, a top panel, a front wall panel, a first side wall panel, a rear wall panel, a second side wall panel, and combinations thereof.

Figure 4:
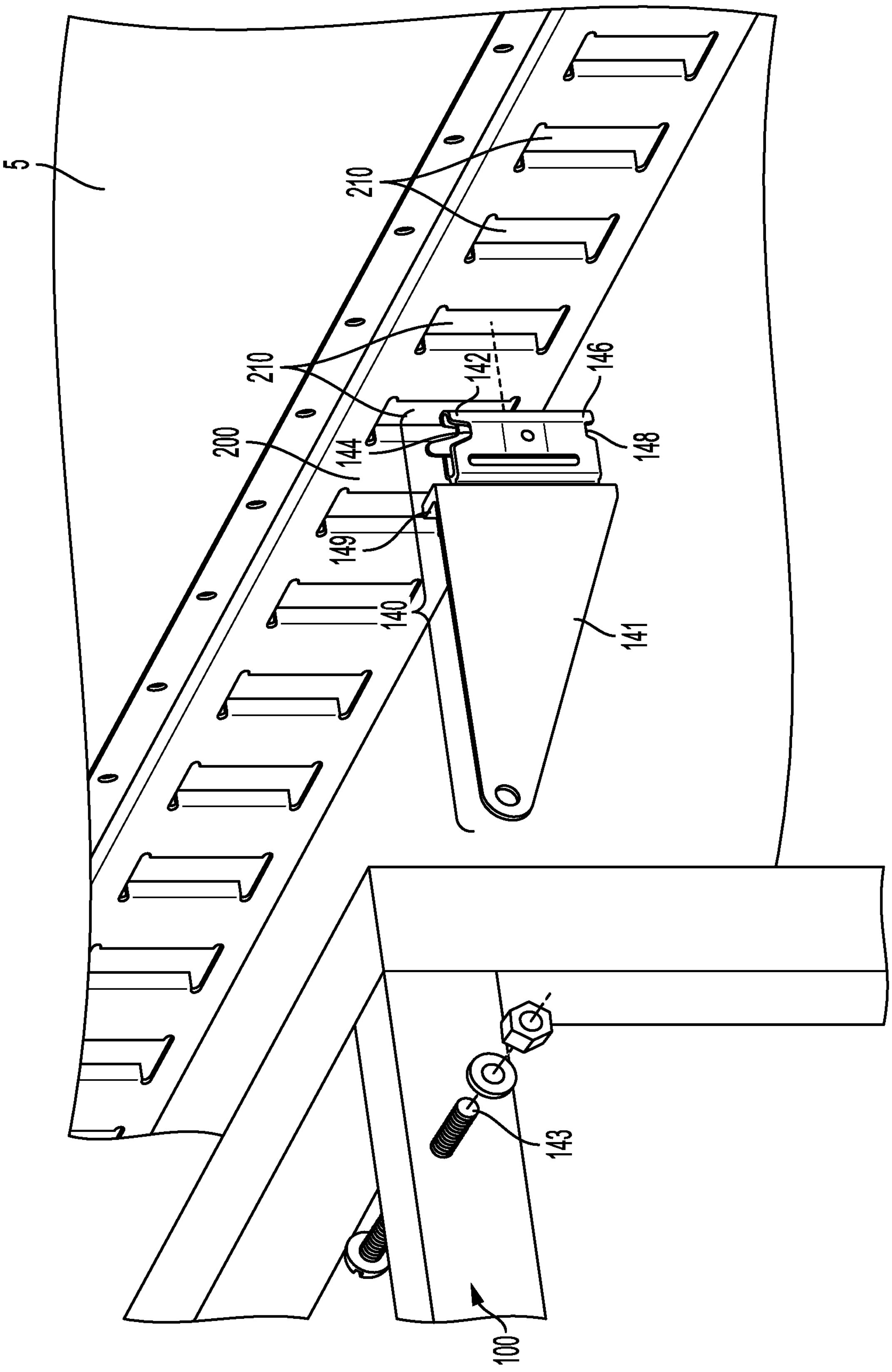
FIG. 4 depicts an exploded view of a frame for a modular trailer conversion unit mounted in a trailer.

FIG. 4 shows an exploded view of one embodiment of mounting a frame (100) within a cargo storage area of a trailer (5). As shown in FIG. 4, the frame may be mounted within the cargo storage area of the trailer using a cargo control track (200) and an attachment mechanism (140). One type of cargo control track and attachment mechanism is commonly referred to as E Track and is available from US Cargo Control of Urbana, Iowa, U.S.A. Another type of cargo control track and attachment mechanism is commonly referred to as S Track or L Track, also available from US Cargo Control of Urbana, Iowa, U.S.A.

U.S. Pat. No. 6,675,980—the teachings of which are incorporated by reference herein in their entirety—describes one type of cargo control track (200). The cargo control track may generally be in the form of a rigid longitudinal member comprising a plurality of receiving member receptacles (210). Each receiving member receptacle may have a generally rectangular shape. The cargo control track can be connected to the interior wall, floor, and/or ceiling of the trailer (5) by a variety of mechanisms including by a plurality of fasteners such as screws, bolts, or rivets; or by welding. In some embodiments, the connection between the cargo control track and the interior wall, floor, and/or ceiling of the trailer may be assisted by an adhesive.

The attachment mechanism (140) may comprise an upper resilient finger (142) adjacent to an upper notch (144). The attachment mechanism may also comprise a lower resilient finger (146) adjacent to a lower notch (148). The attachment mechanism may further comprise a flange (149) extending from the attachment mechanism at an angle of approximately 90°.

Figure 5:
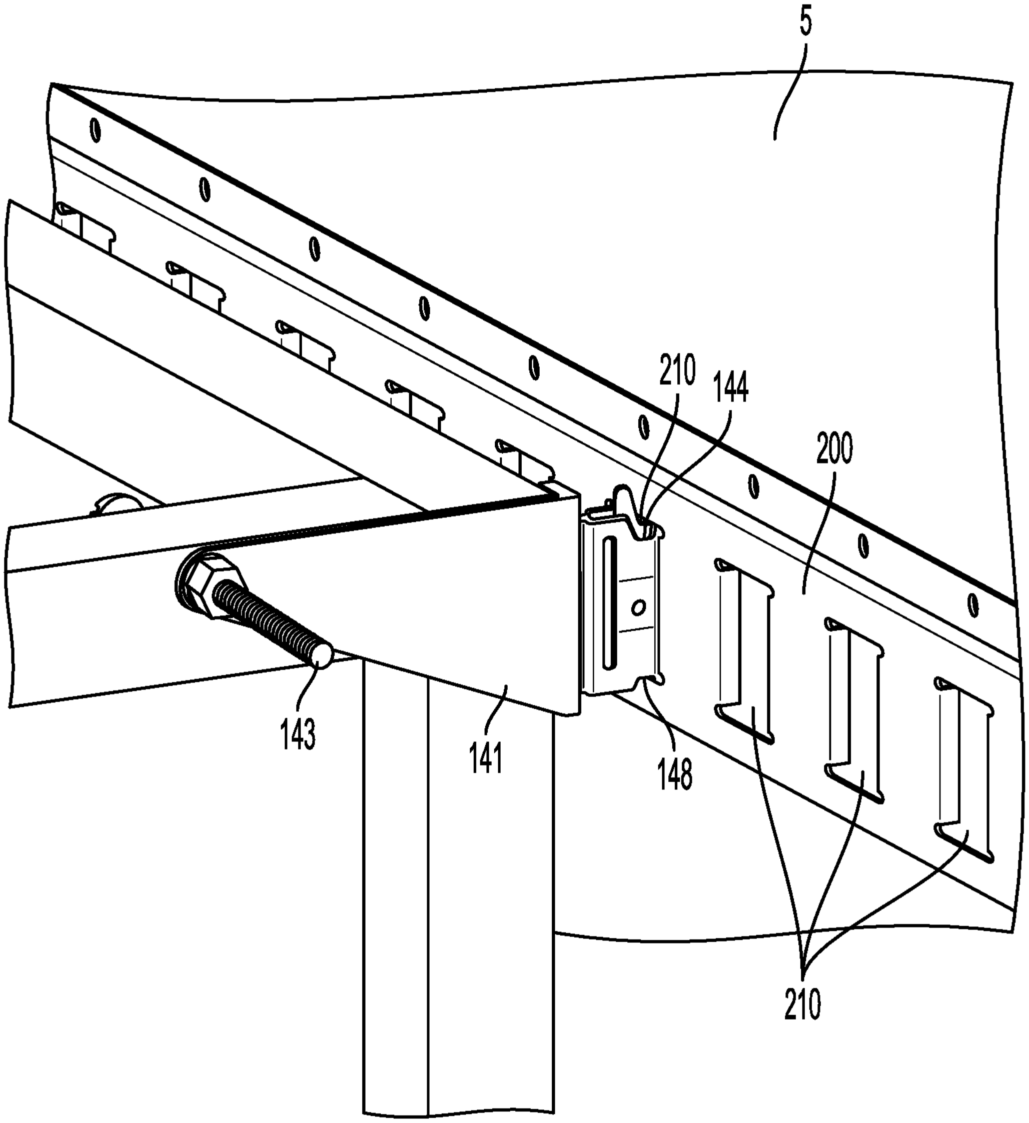
FIG. 5 depicts an assembled view of the mounting of a frame for a modular trailer conversion unit in a trailer.

As shown in FIG. 5, the attachment mechanism (140) may be connected to the frame (100) by an mounting flange (141). As shown in FIG. 4 and FIG. 5, the mounting flange is integrally attached to the flange (149). The mounting flange may then be connected to one of the rigid frame members by passing a fastener (143)—such as a bolt and nut—through a through hole in the mounting flange and a corresponding through hole (135) in the rigid frame member as shown in FIG. 4 and FIG. 5. Alternatively, the attachment mechanism in some embodiments may be connected to the frame by welding the mounting flange and/or the flange to the frame. Another alternative would be a fastening mechanism-such as a bolt-which passes through a hole in the flange before passing through the through hole in the rigid frame member and being held in place by the nut. Individual attachment mechanisms may be attached at any point along the exterior surface of the second rigid base member (112), the first rigid leg member (121), the second rigid leg member (122), or the second rigid upper frame section member (132).

In general, each frame (100) will have at least two attachment mechanisms (140), although embodiments may exist having only a single attachment mechanism while other embodiments may have more than two attachment mechanisms. When the frame is connected to the interior wall, floor, and/or ceiling of the trailer (5), the upper resilient finger (142) of each attachment mechanism is disposed into a void behind an upper portion of one of the plurality of receiving member receptacles (210) of the cargo control track (200) while the lower resilient finger (146) of said attachment mechanism is disposed into a void behind a lower portion of said receiving member receptacle. The upper notch (144) then engages a portion of the upper perimeter of the receiving member receptacle while the lower notch engages a portion of the lower perimeter of the receiving member receptacle. This creates a frictional engagement between the attachment mechanism and the cargo control track which secures the frame to the interior wall, floor, and/or ceiling of the trailer.

In general, each attachment mechanism (140) should be connected to the frame (100) at a height such that the distance measurement between the bottom side of the base (110) and the top edge of the lower notch (148) is less than or equal to the distance measurement between the floor of the trailer and the lower edge of the receiving member receptacle (210). When the distance measurement between the bottom side of the base and the top edge of the lower notch is less than the distance measurement between the floor of the trailer and the lower edge of the receiving member receptacle, the base of the frame will "float" above the floor of the trailer such that there is a gap between the base and the floor of the trailer. When the distance measurement between the bottom side of the base and the top edge of the lower notch is equal to the distance measurement between the floor of the trailer and the lower edge of the receiving member receptacle, the base of the frame will abut against the floor of the trailer.

Figure 6:
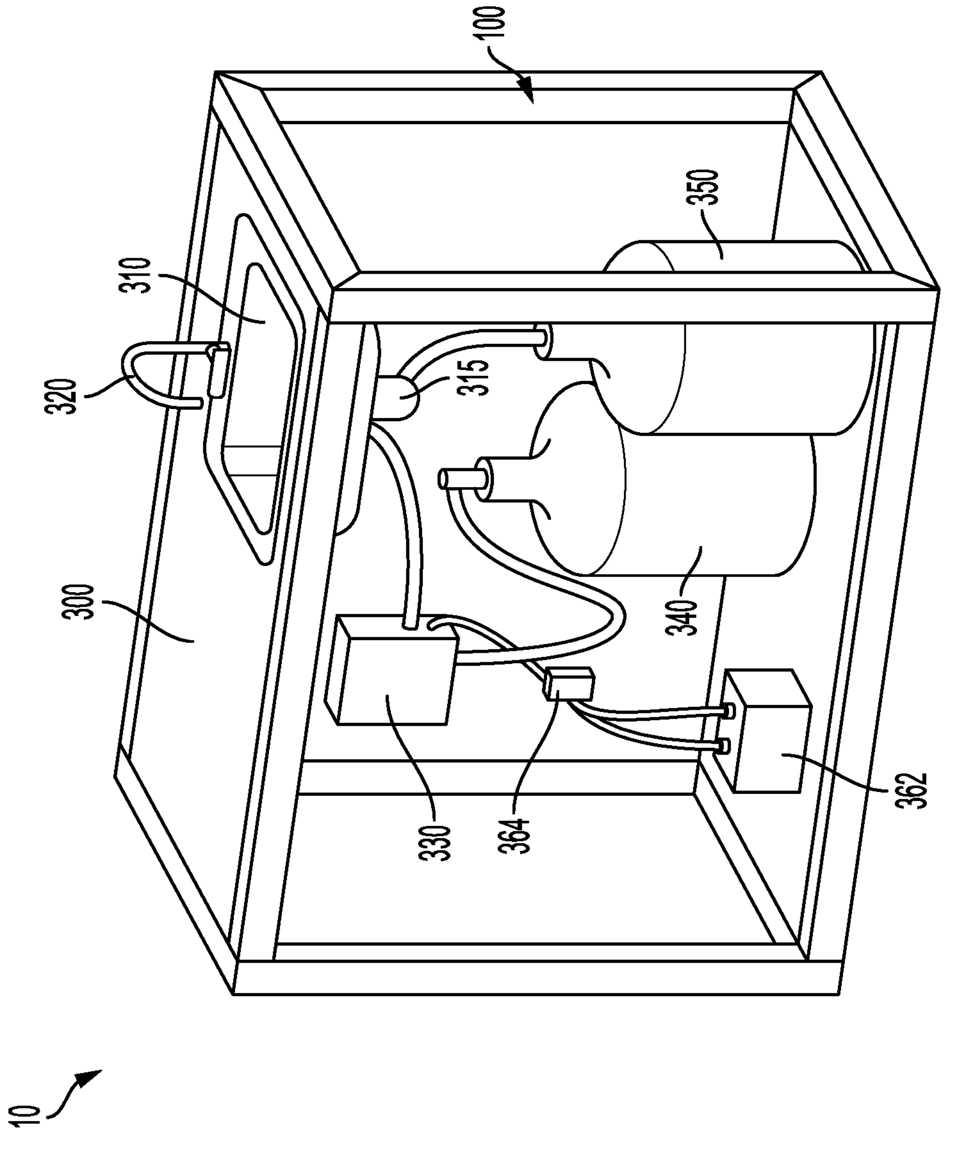
FIG. 6 depicts one embodiment of a modular trailer conversion unit comprising a sink.

The frame (100) may be used as a housing for one or more modular trailer conversion units (10). One embodiment of a modular trailer conversion unit is shown in FIG. 6 and comprises a countertop (300) connected to the upper frame section (130 as shown in FIG. 2 and FIG. 3). The connection between the countertop and the upper frame section may include one or more of a fastener such as a bolt, a screw, or a rivet; or a weld or an adhesive.

Figure 7:
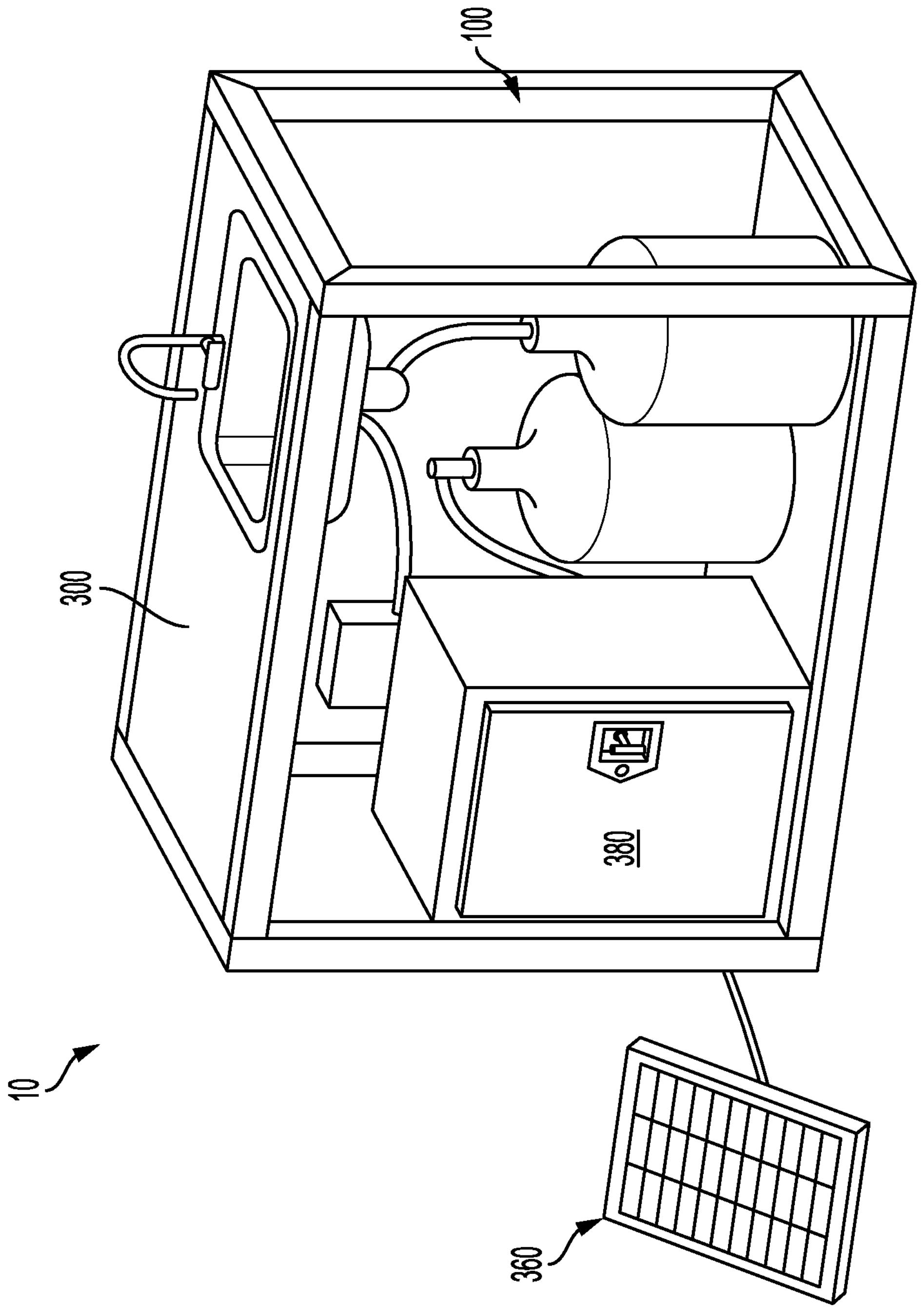
FIG. 7 depicts one embodiment of a modular trailer conversion unit comprising a storage cabinet.
Figure 8:
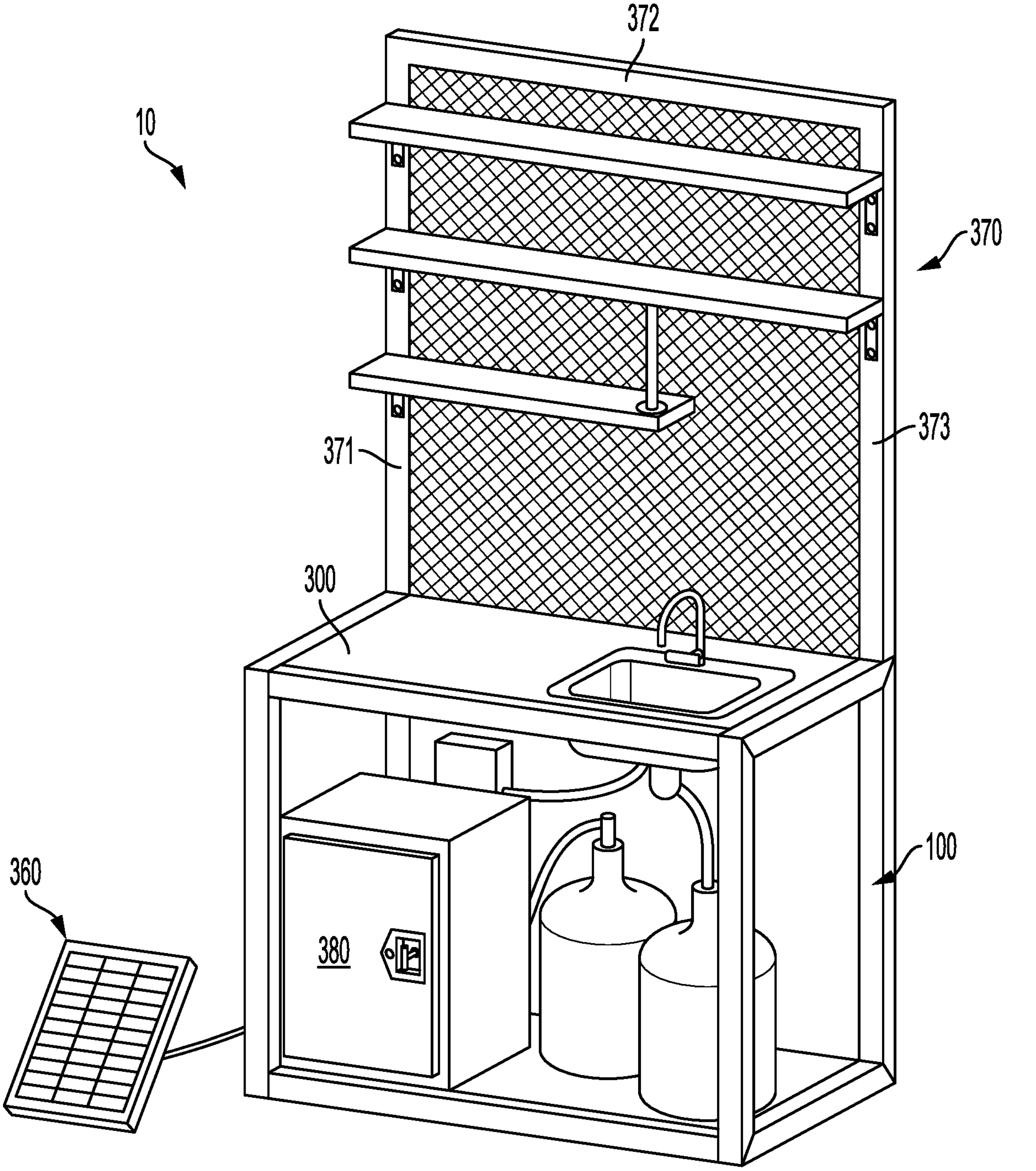
FIG. 8 depicts one embodiment of a modular trailer conversion unit comprising a backstop.

Also shown in FIG. 6 through FIG. 8, in some embodiments the modular trailer conversion unit (10) may include a sink. Such embodiments may be referred to as a sink module. In such embodiments, there may be a sink basin (310) within the countertop (300). The sink basin may be a single sink basin or a double sink basin having two basins arranged in a side-by-side configuration. A faucet (320) may be connected to an edge of the sink basin as shown in FIG. 6.

The sink may also comprise a sink water pump (330), a sink fresh water source (340), a sink drain (315), and a sink waste water tank (350) as shown in FIG. 6. Each of the sink fresh water source and the sink waste water tank may be in the form of a rigid container made of a material such as metal (steel, aluminum, etc.) or rigid plastic having a single opening to allow flow of water out of (in the case of the sink fresh water source) or into (in the case of the sink waste water tank) the container. Preferably, the sink fresh water source and the sink waste water tank will be capable of holding substantially the same volume of water. In preferred embodiments, each of the sink fresh water source and the sink waste water tank will be removably connected to the sink module to allow for refilling of the sink fresh water source and disposal of waste water from the sink waste water source.

As shown in FIG. 6, the sink water pump (330) may be fluidly connected at one end to the faucet (320) such as by a hose, line, or pipe with appropriately mated fittings. At an opposite end, the sink water pump may be fluidly connected to the sink fresh water source (340) such as by a hose, line, or pipe with appropriately mated fittings. When the sink water pump is turned on, the sink water pump will draw water from within the sink fresh water source through the pump to be fed to and discharged from the faucet (320) into the sink basin (310).

The sink water pump (330) may be an electrical water pump which operates by closing a circuit between the sink water pump and a power source to turn the sink water pump on. One common power source, as shown in FIG. 6, is a battery (362). When used, the battery may be any type of battery commonly used in automotive, marine, and recreational vehicle applications. In some embodiments, the battery may be connected to the sink water pump through an inverter (364) as shown in FIG. 6. An inverter is a commonly known electronic device which changes direct current (DC) to alternating current (AC). In some embodiments, the power source may be configured to electrically connect to a solar panel (360 as shown in FIG. 7) to provide a source of electricity to recharge the power source. One example of such a solar panel is a Lion Safari UT 700 available from Lion Energy of American Fork, Utah, U.S.A. In other embodiments (not shown) the power source may be configured to electrically connect to a generator or an electrical grid to provide a source of electricity to recharge the power source.

The sink drain (315) may be in the form of an opening located within the sink basin (310)—preferably within a bottom surface of the sink basin. Once water has been discharged from the faucet into the sink basin it may pass through the sink drain into the sink waste water tank (350) for collection with the drain and the sink waste water tank (350) fluidly connected by a hose, line, or pipe with appropriately mated fittings. Preferably the sink waste water tank will be removable from the frame to allow for disposal of waste water that has passed through the drain. In certain embodiments, the sink waste water tank may comprise a secondary valve which can be opened or closed to allow the waste water to be removed from the sink waste water tank via a hose or line.

As shown in FIG. 7, in some embodiments, the modular trailer conversion unit (10) may also comprise a storage cabinet (380). When present, the storage cabinet may be mounted within the frame (100). While the storage cabinet may be mounted at any location within the frame, preferably the storage cabinet will be mounted along the base (110). The storage cabinet may be mounted to the frame via any one of a fastener such as a screw, bolt, or rivet; or by a weld or an adhesive. In some embodiments, the storage cabinet may contain one or more of the power source (i.e.—the battery (362 as shown in FIG. 6)) and/or the inverter (364). In other embodiments, a water pump (the sink water pump (330), toilet water pump (610), or the shower water pump (710)) may be mounted on a sidewall of the storage cabinet. While FIG. 7 shows the storage cabinet in use with a sink module, storage cabinet(s) may be used in other types of modules including a stove module as described with reference to FIG. 11 herein or a toilet module as described with reference to FIG. 12 herein. Alternatively, storage cabinet(s) may exist within their own independent module-referred to herein as a storage cabinet module.

In some embodiments, the modular trailer conversion unit (10) may comprise a backstop (370) as shown in FIG. 8. The backstop may comprise a first rigid backstop member (371), a second rigid backstop member (372), a third rigid backstop member (373), and a backstop panel. The backstop panel may be disposed over or within a void defined by the first rigid backstop member, the second rigid backstop member, the third rigid backstop member, and the second rigid upper frame section member (132) with the backstop panel attached to the rigid backstop member(s) via any one of a fastener such as a screw, bolt, or rivet; or by a weld or an adhesive.

The rigid backstop members (371, 372, 373) may be fabricated of any rigid materials. Preferred rigid materials include metals, woods, and rigid plastic. Nonlimiting examples of metals include steel, stainless steel, aluminum, and titanium. Nonlimiting examples of rigid plastics may include high-density polyethylene (HDPE), rigid polyesters such as polyethylene terephthalate (PET) and polyethylene naphthalate (PEN), and rigid polyamides such as nylon.

The first rigid backstop member (371) may be connected to the frame along the length of the second rigid upper frame section member (132) or at a juncture point between the first rigid upper frame section member (131) and the second rigid upper frame section member. Likewise, the third rigid backstop member (373) may be connected to the frame along the length of the second rigid upper frame section member or at a juncture point between the second rigid upper frame section member and the third rigid upper frame section member (133). The second rigid backstop member (372) may extend between the first rigid upper frame section member and the second rigid upper frame section member at an end of each which is opposite from the end attached to the frame. In general, the connection may be either a permanent connection or a nonpermanent connection. Nonlimiting examples of permanent connections include welding one member to another, or manufacturing two or more members of a single integral pieces of material, such as by injection molding or extrusion molding. Nonlimiting examples of nonpermanent connections include threading one member into another or connecting one member to another using a fastener such as a bolt, screw, or rivet.

Figure 9:
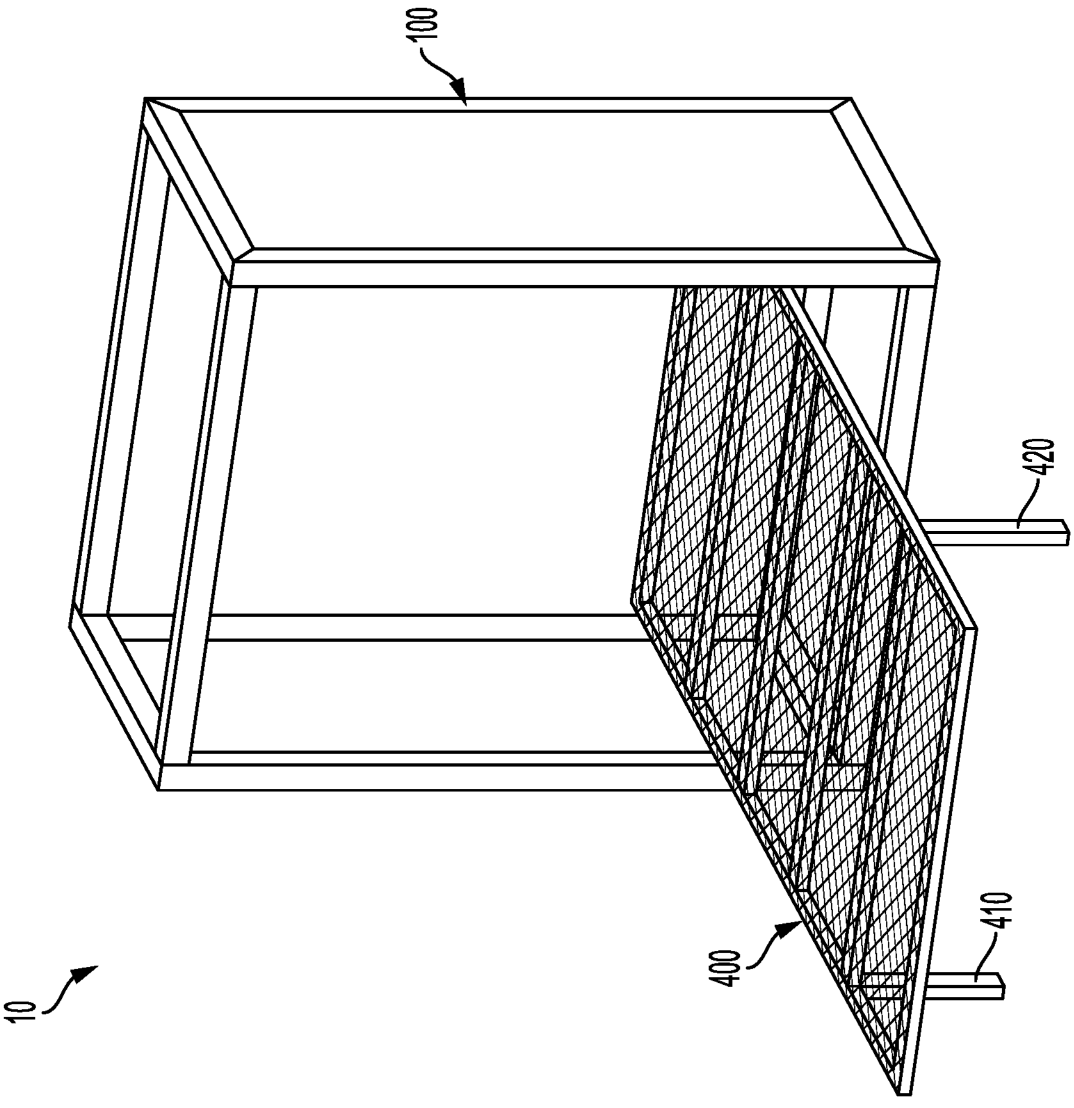
FIG. 9 depicts one embodiment of a modular trailer conversion unit comprising a bed frame.
Figure 10:
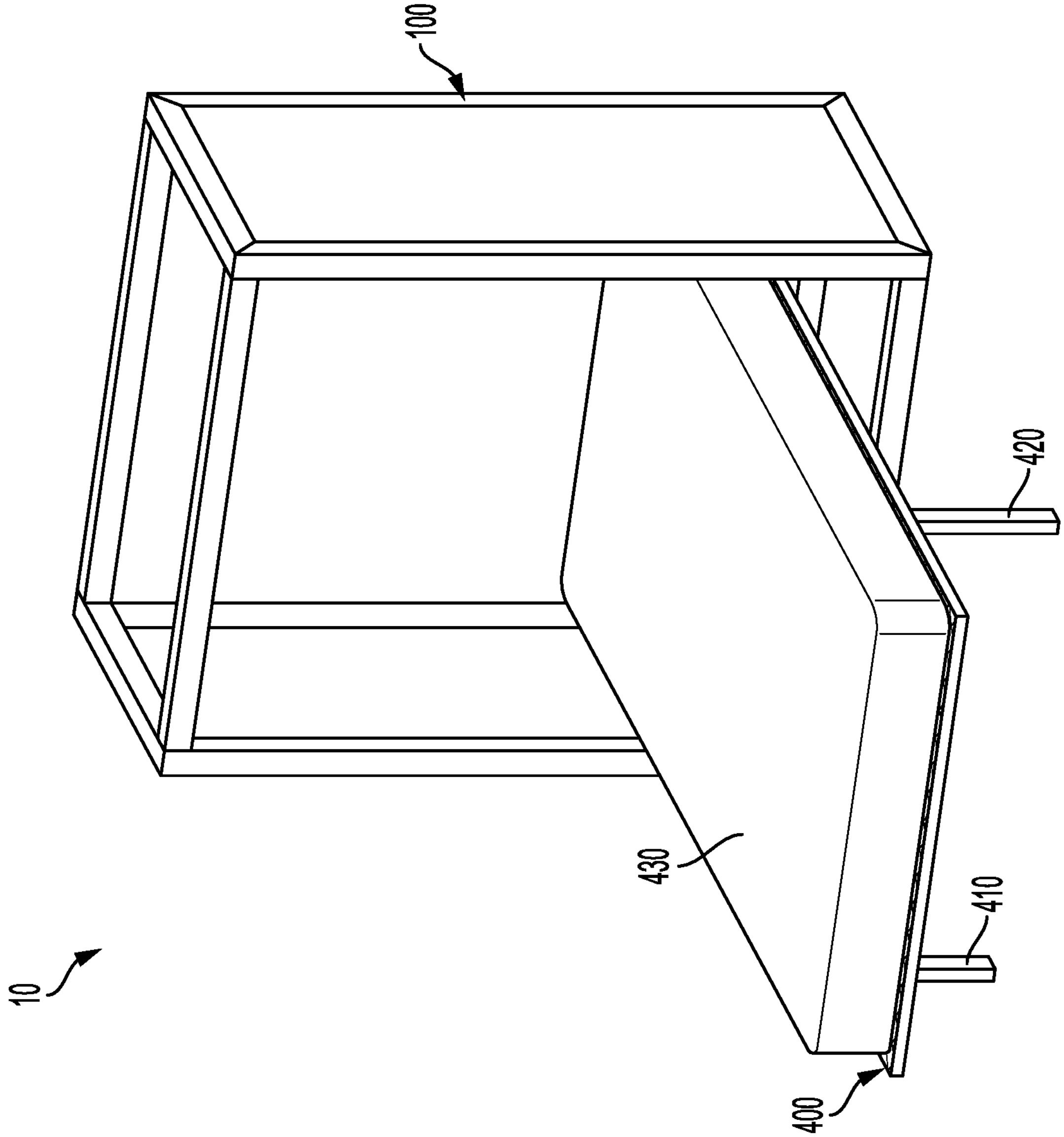
FIG. 10 depicts one embodiment of a modular trailer conversion unit comprising a bed.

Another embodiment of a modular trailer conversion unit (10) is shown in FIG. 9 and FIG. 10 and may be referred to herein as a bed module. As shown in FIG. 9, the bed module may comprise a bed frame (400). Preferably, the bed frame will be of substantially rectangular construction and may include a mesh material as shown in FIG. 9. The mesh material may be either a metal mesh or a fabric mesh. Metal mesh may be made out of any metal including steel, stainless steel, aluminum, titanium, and the like. Fabric mesh material may be made out of any fabric traditionally used in cargo netting such as cotton, linen, or synthetic fabrics such as nylon.

Extending from the bed frame (400) may be at least a first bed frame leg (410) and a second bed frame leg (420) which-when in use-abut against a floor of the trailer to provide structural support for the bed frame to bear the weight of a mattress (430 as shown in FIG. 10) placed on top of the bed frame and one or more persons lying on the mattress.

Preferably the bed module will be used with a frame (100) of a parallelogram shape—such as that shown in FIG. 3—have a third rigid leg member (123 as shown in FIG. 3) and a fourth rigid leg member (124 as shown in FIG. 3). The bed frame may be pivotably connected to each of the third rigid leg member and the fourth rigid leg member as shown in FIG. 9. The bed frame may be pivotably connected to the rigid leg member using specialized fasteners such as hinges or bearings.

In some embodiments, the mattress (430) will be a twin size mattress, in which case the bed frame (400) will be sized and shaped to substantially match the size and shape of a traditional twin size mattress. In other embodiments, the mattress will be a full size mattress, in which case the bed frame will be sized and shaped to substantially match the size and shape of a traditional full size mattress. In other embodiments, the mattress will be a queen size mattress, in which case the bed frame will be sized and shaped to substantially match the size and shape of a traditional queen size mattress. In other embodiments, the mattress will be a king size mattress, in which case the bed frame will be sized and shaped to substantially match the size and shape of a traditional king size mattress. In other embodiments, the mattress will be a California king size mattress, in which case the bed frame will be sized and shaped to substantially match the size and shape of a traditional California king size mattress. It may also be described that the mattress may be selected from the group consisting of a twin size mattress, a full size mattress, a queen size mattress, a king size mattress, and a California king size mattress.

Figure 11:
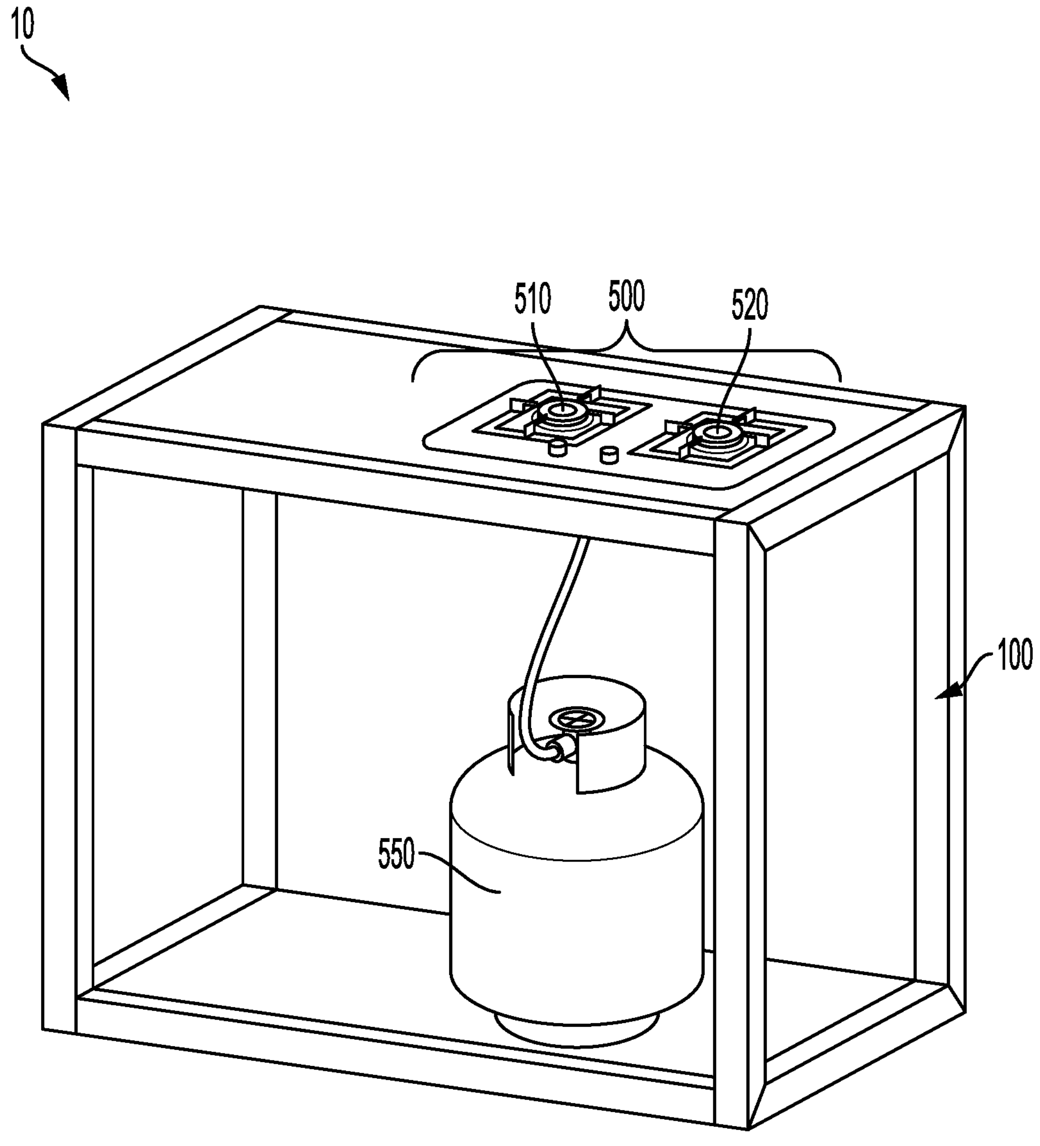
FIG. 11 depicts one embodiment of a modular trailer conversion unit comprising a stove.

Another embodiment of a modular trailer conversion unit (10) is shown in FIG. 11 and may be referred to herein as a stove module. As shown in FIG. 11, the stove module may comprise a countertop (300) which may further comprise at least one stovetop (500). The stovetop may comprise at least a first stove burner (510) fluidly connected to a fuel source (550). In certain embodiments, the stovetop may further comprise at least a second burner (520) fluidly connected to the fuel source. In still other embodiments (not shown), the stovetop may further comprise at least a third stove burner and a fourth stove burner, each of which may be fluidly connected to the fuel source.

The fuel source (550) may be a tank containing liquefied petroleum gas (LPG). LPG is known to be a flammable mixture of hydrocarbon gases commonly used as a fuel in heating appliances such as stoves, hot water tanks, and the like. LPG commonly includes one or a mixture of propane ($C_3H_8$) and butane ($C_4H_{10}$) although other compounds such as propylene, butylene, tetrahydrothiophene, and amyl mercaptan may also be included. When a valve in the fluid connection between the fuel source and the burner(s) is opened, the LPG may be ignited by an ignition source to produce a controlled flame for heating food or water. The ignition source may be an open flame such as from a match or lighter, or may be an electrical spark. In preferred embodiments, the fuel source will be removably connected to the stove module to allow for refilling of the fuel source. While FIG. 11 shows the fuel source located within the frame, in some embodiments the fuel source may be located outside of the frame—or even outside of the enclosed cargo trailer.

In some embodiments, instead of being fluidly connected to a fuel source, one or more of the burners may be electrically connected to an electricity source such as a power source (i.e.—a battery (362 as shown in FIG. 6) which may be connected to an inverter (364 as shown in FIG. 6)). When a circuit between the electricity source and the burner is closed, electricity may be conducted to the burner which may comprise a heating coil for heating food or water.

In some embodiments, the stove module as shown in FIG. 11 may be combined with the sink module as shown in any of FIG. 6 to FIG. 8 to produce a combined stove and sink module. For example, the at least one stovetop (500) may be added to a sink module as shown in any of FIG. 6 to FIG. 8 with one or more stove burners (510, 520) located adjacent to the sink basin (310) and a fuel source (550) fluidly connected to the one or more stove burners (or an electricity source electrically connected to the one or more stove burners) as described herein.

Figure 12:
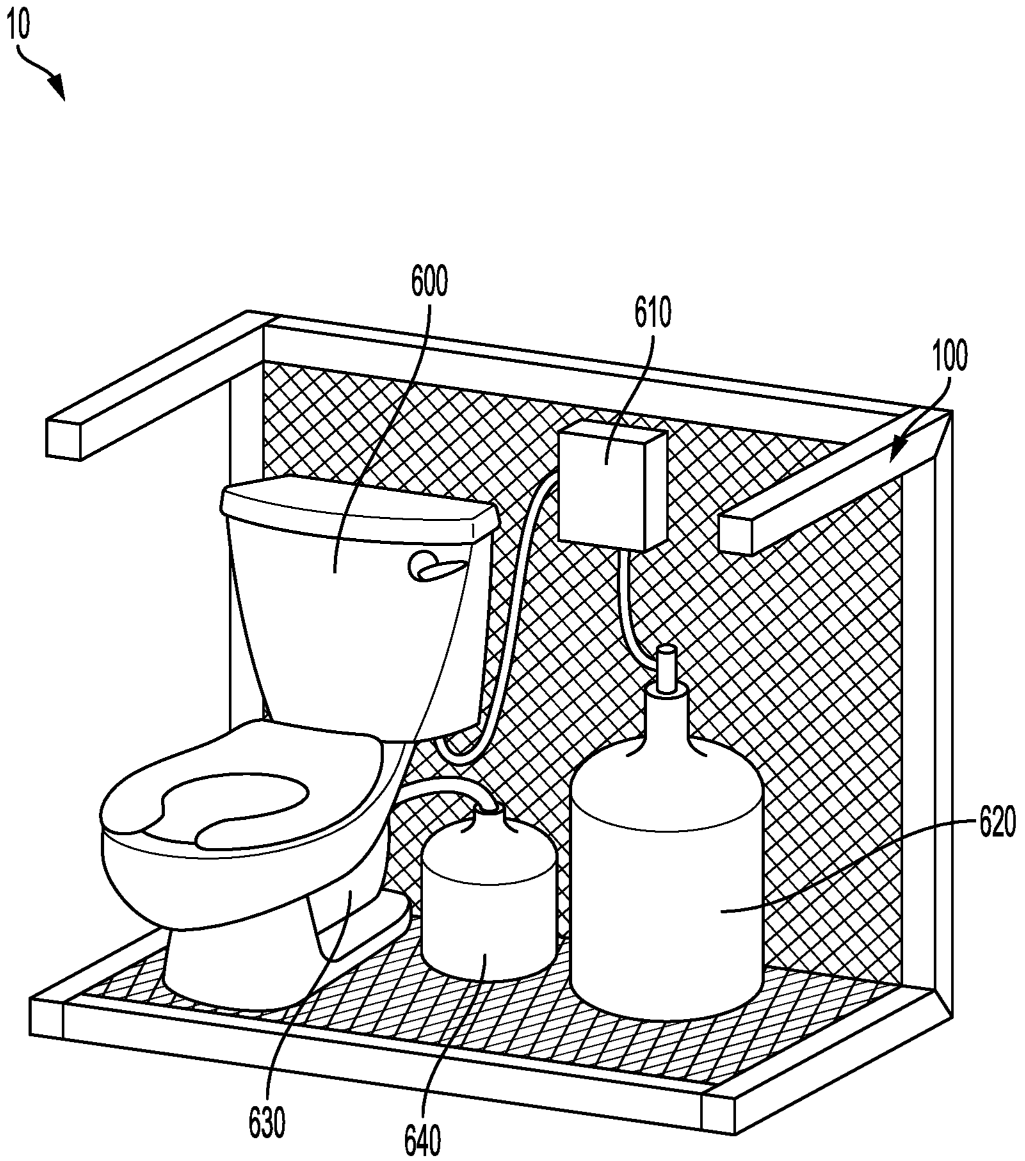
FIG. 12 depicts one embodiment of a modular trailer conversion unit comprising a toilet.

Yet another embodiment of a modular trailer conversion unit (10) is shown in FIG. 12 and may be referred to herein as a toilet module. The toilet module may comprise a toilet (600) connected to the frame (100). The toilet may be fluidly connected to a toilet water pump (610) by a hose, line, or pipe with appropriately mated fittings. In turn, the toilet water pump may be fluidly connected to a toilet fresh water source (620) by a hose, line, or pipe with appropriately mated fittings. When a toilet fill valve within the toilet tank is opened, fresh water from within the toilet fresh water source may be pumped through the toilet water pump and into the toilet tank of the toilet to allow for further flushing. In some embodiments, the toilet water pump may be an electrical water pump which operates by closing a circuit between the toilet water pump and a power source to turn the toilet water pump on. In some embodiments the power source may be a battery (362 as shown in FIG. 6) which may be configured to electrically connect to a solar panel (360 as shown in FIG. 6), a generator, and/or an electrical grid for recharging. The battery—when used—may be configured to electrically connect to the toilet water pump though an inverter (364 as shown in FIG. 6).

The toilet (600) may further comprise a toilet drain (630) which may be fluidly connected to a toilet waste water tank (640) by a hose, line, or pipe with appropriately mated fittings. When a flush valve of the toilet is opened, waste within the toilet bowl may pass through the toilet drain and into the toilet waste water tank.

In some embodiments, the toilet waste water tank (640) may be mounted outside of the frame (100). For instance, the toilet waste water tank may be mounted to an exterior of the trailer beneath the floor of the trailer. In which case there may be a hole in the floor of the trailer through which the fluid connection between the toilet drain (630) and the toilet waste water tank may pass.

Each of the toilet fresh water source (620) and the toilet waste water tank (640) may be in the form of a rigid container made of a material such as metal (steel, aluminum, etc.) or rigid plastic having a single opening to allow flow of water out of (in the case of the toilet fresh water source) or into (in the case of the toilet waste water tank) the container. Preferably the toilet fresh water source (620) and the toilet waste water tank will be capable of holding substantially the same volume of water. In certain embodiments, the toilet waste water tank may comprise a secondary valve which can be opened or closed to allow the waste water to be removed from the toilet waste water tank via a hose or line. In preferred embodiments, each of the toilet fresh water source and the toilet waste water tank will be removably connected to the toilet module to allow for refilling of the toilet fresh water source and disposal of waste water from the toilet waste water source.

Figure 13:
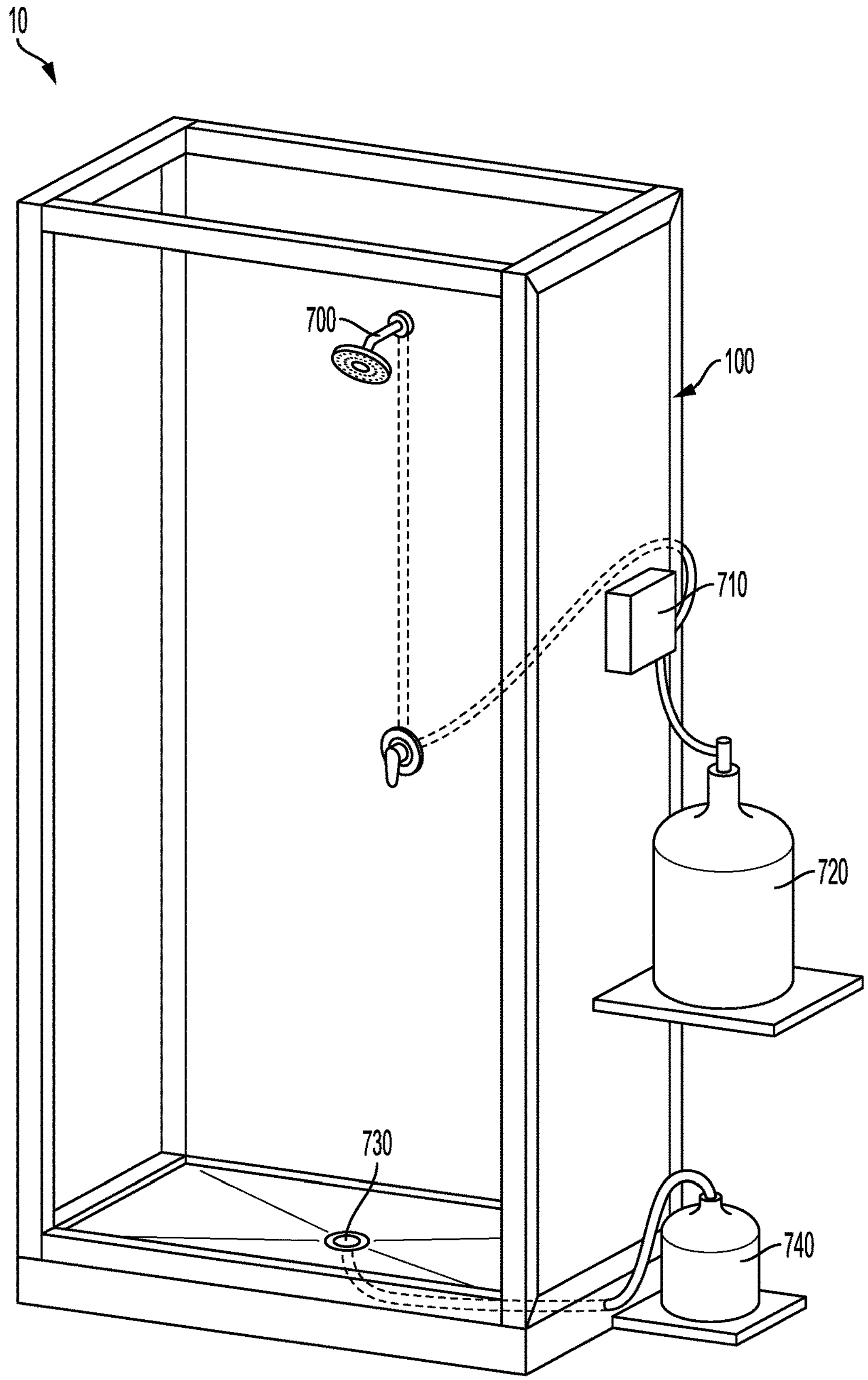
FIG. 13 depicts one embodiment of a modular trailer conversion unit comprising a shower.

Still another embodiment of a modular trailer conversion unit (10) is shown in FIG. 13 and may be referred to herein as a shower module. The shower module may comprise a shower (700) connected to the frame. The shower may be comprised of a shower handle fluidly connected to a shower head. The shower (preferably the shower handle) may be fluidly connected to a shower water pump (710) by a hose, line, or pipe with appropriately mated fittings. In turn, the shower water pump may be fluidly connected to a shower fresh water source (720) by a hose, line, or pipe with appropriately mated fittings. When the shower handle is opened, fresh water from within the shower fresh water source may be pumped through the shower water pump and through the shower to be discharged out of the shower head. In some embodiments, the shower water pump may be an electrical water pump which operates by closing a circuit between the shower water pump and a power source to turn the shower water pump on. In some embodiments the power source may be a battery (362 as shown in FIG. 6) which may be configured to electrically connect to a solar panel (360 as shown in FIG. 6), a generator, and/or an electrical grid for recharging. The battery—when used—may be configured to electrically connect to the shower water pump through an inverter (364 as shown in FIG. 6).

The shower (700) may further comprise a shower drain (730) which may be fluidly connected to a shower waste water tank (740) by a hose, line, or pipe with appropriately mated fittings. When a water discharged from the shower head hits a floor of the shower, it is directed towards the shower drain where it passes through the fluid connection between the shower drain and the shower waste water tank for collection in the shower waste water tank.

In some embodiments, the shower waste water tank (740) may be mounted outside of the frame (100). For instance, the shower waste water tank may be mounted to an exterior of the trailer beneath the floor of the trailer. In which case there may be a hole in the floor of the trailer through which the fluid connection between the shower drain (730) and the shower waste water tank may pass.

Each of the shower fresh water source (720) and the shower waste water tank (740) may be in the form of a rigid container made of a material such as metal (steel, aluminum, etc.) or rigid plastic having a single opening to allow flow of water out of (in the case of the shower fresh water source) or into (in the case of the shower waste water tank) the container. Preferably the shower fresh water source and the shower waste water tank will be capable of holding substantially the same volume of water. In certain embodiments, the shower waste water tank may comprise a secondary valve which can be opened or closed to allow the waste water to be removed from the shower waste water tank via a hose or line. In preferred embodiments, each of the shower fresh water source and the shower waste water tank will be removably connected to the shower module to allow for refilling of the shower fresh water source and disposal of waste water from the shower waste water source.

In some embodiments, the shower module as shown in FIG. 13 may be combined with the toilet module as shown in FIG. 12 to produce a combined toilet and shower module. For example, the shower (700) may be added to a toilet module as shown in FIG. 12 with the shower located adjacent to the toilet (600). The shower and toilet may have separate fresh water sources, water pumps, and waste water tanks. In some embodiments, the shower and the toilet may share a fresh water source and a water pump. In some embodiments, the shower and the toilet may share a waste water tank. In still other embodiments, the shower and the toilet may share each of a fresh water source, a water pump, and a waste water tank.

Figure 14:
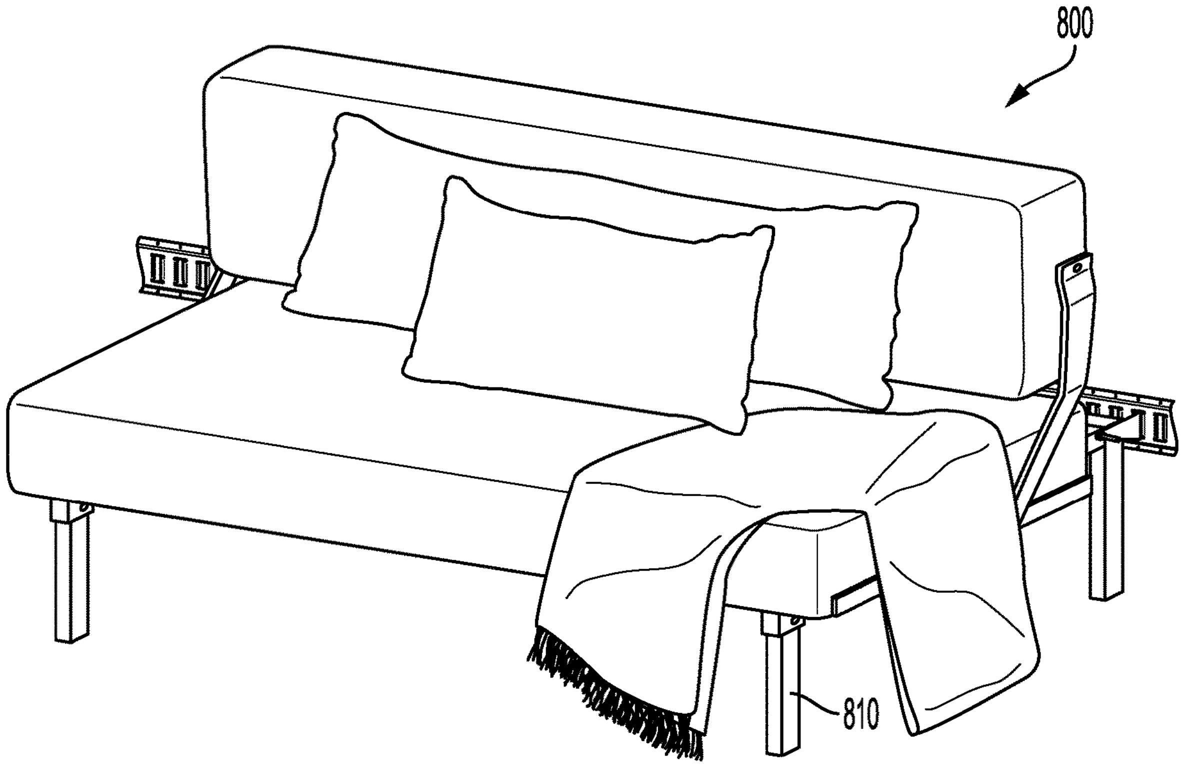
FIG. 14 depicts one embodiment of a modular trailer conversion unit comprising a couch.

Yet another embodiment of a modular trailer conversion unit (10) is shown in FIG. 14 and may be referred to herein as a seating module. The seating module may comprise a seating element—such as a couch (800 as shown in FIG. 14), armchair, or recliner. The seating element may also include one or more legs—such as the couch leg (810) shown in FIG. 14—which extends between the seating element bottom surface and the floor to provide rigidity and stability for the seating element.

In some embodiments the seating element may be connected to the frame. However, in other embodiments as shown in FIG. 14, the seating element may not be connected to the frame. When the seating element is not connected to the frame, the attachment mechanism (140) may be directly connected to a rigid member of the seating element to allow the seating element to connect to the cargo control track (200) as shown in FIG. 14.

Figure 15:
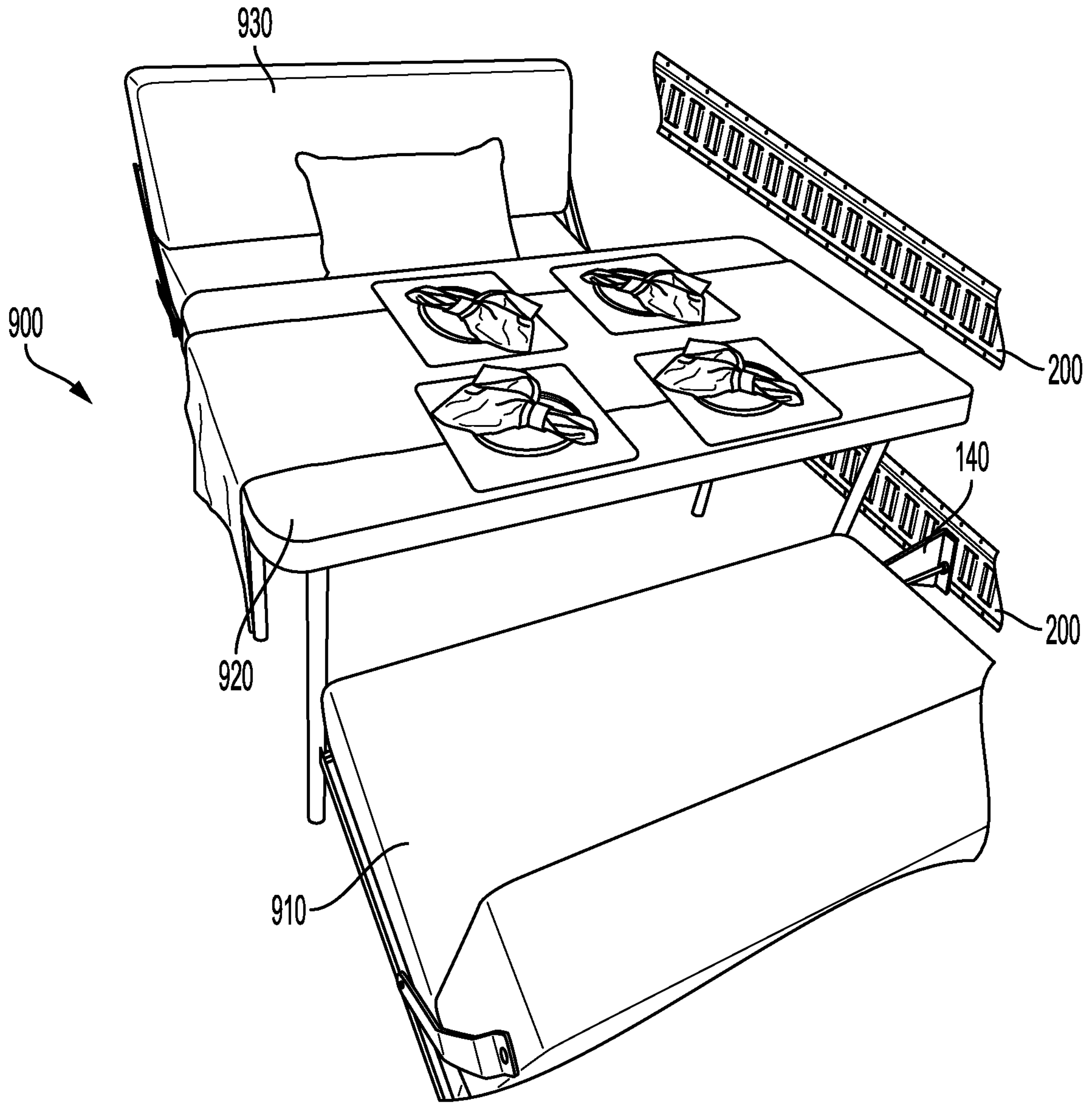
FIG. 15 depicts one embodiment of a modular trailer conversion unit comprising a dinette.

Still another embodiment of a modular trailer conversion unit (10) is shown in FIG. 15 and may be referred to herein as a dinette (900) module. The dinette module may comprise at least at least a dinette first bench (910) and a dinette table (930). In some embodiments, the dinette module may further comprise a dinette second bench (920).

In some embodiments, one or more of the dinette first bench (910), the optional dinette second bench (920), and the dinette table (930) may be connected to the frame. This may be achieved by connecting each of the dinette module elements (dinette first bench, optional dinette second bench, and dinette table) to their own individual frame, or by attaching two or more dinette module elements to a single frame.

In other embodiments—such as those shown in FIG. 15—the dinette module elements (dinette first bench (910), optional dinette second bench (920), and dinette table (930)) may not be connected to the frame. When a dinette module element is not connected to the frame, the attachment mechanism (140) may be directly connected to a rigid member of the corresponding dinette module element to allow the dinette module element to connect to the cargo control track (200) as shown in FIG. 15.

The various modular trailer conversion units may form a modular system for converting at least a portion of a trailer (5) to a living quarters. The system may comprise at least one frame (100), at least one cargo control track (200) comprising at least one receiving member receptacle (210), at least one attachment mechanism (140), and at least one living quarters module. The at least one living quarters module may be selected from the group consisting of a sink module, a storage cabinet module, a bed module, a stove module, a toilet module, a shower module, a combined stove and sink module, a combined toilet and shower module, a seating module, and a dinette module. Each living quarters module may be connected to one of the at least one frame.

Using the frame (100) with attachment mechanisms (140) of the type described herein which are configured to connect the frame to the at least one cargo control track (200) at the at least one receiving member receptacle (210) allows each living quarters module to be easily moved into and out of an enclosed cargo trailer so that the enclosed cargo trailer can quickly and easily be converted from cargo transportation use to recreational vehicle use. This also allows each living quarters module to be easily moved from one location to another within the interior of the enclosed cargo trailer to allow for different configurations of living quarters modules.

What is claimed is:

1. A frame (100) for a modular trailer conversion unit (10) comprising:

a base (110) comprising at least a first rigid base member (111), a second rigid base member (112), and a third rigid base member (113);

a plurality of legs (120) comprising at least a first rigid leg member (121), and a second rigid leg member (122);

an upper frame section (130) comprising at least a first rigid upper frame section member (131), a second rigid upper frame section member (132), and a third rigid upper frame section member (133); and at least one attachment mechanism (140) comprising an upper resilient finger (142) adjacent to an upper notch (144), a lower resilient finger (146) adjacent to a lower notch (148), and a flange (149); and wherein the first rigid leg member is connected to and extends upwardly from the base originating at a first juncture point (115) between the first rigid base member and the second rigid base member;

wherein the second rigid leg member is connected to and extends upwardly from the base originating at a second juncture point (116) between the second rigid base member and the third rigid base member;

wherein the first rigid upper frame section member is connected to and extends perpendicular from the first rigid leg member in a first plane substantially parallel with the first rigid base member;

wherein the second rigid upper frame section member is connected to and extends between the first rigid leg member and the second rigid leg member in a second plane substantially parallel with the second rigid base member;

wherein the third rigid upper frame section member is connected to and extends perpendicular from the second rigid leg member in a third plane substantially parallel with the third rigid base member;

wherein at least one of the second rigid base member, the first rigid leg member, the second rigid leg member, and the second rigid upper frame section member comprises at least one through hole (135) passing through the respective member;

wherein a mounting flange (141) extends from the flange in a direction opposite the upper resilient finger and the lower resilient finger;

wherein each attachment mechanism of the at least one attachment mechanism is connected to the frame by a fastener (143) passing through the mounting flange and the at least one through hole; and wherein the at least one attachment mechanism is configured to removably attach to a receiving member receptacle (210) of a cargo control track (200), said cargo control track configured to connect to an interior wall, floor, and/or ceiling of a trailer (5).

2. The frame of claim 1, further comprising a third rigid leg member (123), a fourth rigid leg member (124), and a fourth rigid base member (114), wherein the third rigid leg member is connected to and extends upwardly from the base originating at an end of the first rigid base member opposite the first juncture point, and the fourth rigid leg member is connected to and extends upwardly from the base originating at an end of the second rigid base member opposite the second juncture point.

3. The frame of claim 2, wherein the upper frame section further comprises a fourth rigid upper frame section member (134).

4. The frame of claim 3, further comprising a countertop (300) connected to the upper frame section.

5. The frame of claim 4, wherein the countertop further comprises at least one sink basin (310) and a faucet (320) wherein the faucet is fluidly connected to a sink water pump (330), the sink water pump is fluidly connected to a sink fresh water source (340), and the sink basin comprises a sink drain (315) which is fluidly connected to a sink waste water tank (350).

6. The frame of claim 5, wherein the sink water pump is electrically connected to a power source, wherein said power source provides a source of electricity for powering the sink water pump, and wherein the power source is electrically connected to the sink water pump through an inverter (364).

7. The frame of claim 6, wherein the power source is a battery (362), wherein the power source is configured to electrically connect to a solar panel (360), and wherein said solar panel is capable of providing a source of electricity for recharging the power source.

8. The frame of claim 5, further comprising a backstop (370) comprising a first rigid backstop member (371), a second rigid backstop member (372), a third rigid backstop member (373), and a backstop panel disposed over or within a void defined by the first rigid backstop member, the second rigid backstop member, the third rigid backstop member, and the second rigid upper frame section member.

9. The frame of claim 4, wherein the countertop further comprises at least one stovetop (500) comprising at least a first stove burner (510) fluidly connected to a fuel source (550).

10. The frame of claim 9, wherein the fuel source is a tank containing liquefied petroleum gas (LPG).

11. The frame of claim 2, further comprising a bed frame (400) of substantially rectangular construction comprising at least a first bed frame leg (410) and a second bed frame leg (420), wherein the bed frame is pivotably connected to each of the third rigid leg member and the fourth rigid leg member, and wherein the bed frame further comprises a mattress (430).

12. The frame of claim 1, further comprising a toilet (600) connected to the frame, wherein the toilet is fluidly connected to a toilet water pump (610), the toilet water pump is fluidly connected to a toilet fresh water source (620), the toilet comprises a toilet drain (630), and the toilet drain is fluidly connected to a toilet waste water tank (640).

13. The frame of claim 12, wherein the toilet water pump is electrically connected to a power source, wherein said power source provides a source of electricity for powering the toilet water pump, and wherein the power source is electrically connected to the toilet water pump through an inverter (364).

14. The frame of claim 13, wherein the power source is a battery (362), wherein the power source is configured to electrically connect to a solar panel (360) and wherein said solar panel is capable of providing a source of electricity for recharging the power source.

15. The frame of claim 1, further comprising a shower (700) connected to the frame, wherein the shower is fluidly connected to a shower water pump (710), the shower water pump is fluidly connected to a shower fresh water source (720), the shower comprises a shower drain (730), and the shower water drain is fluidly connected to a shower waste water tank (740).

16. The frame of claim 15, wherein the shower water pump is electrically connected to a power source, wherein said power source provide a source of electricity for powering the shower water pump, and wherein the power source is electrically connected to the shower water pump through an inverter (364).

17. The frame of claim 16, wherein the power source is a battery, wherein the power source is configured to electrically connect to a solar panel (360), and wherein said solar panel is capable of providing a source of electricity for recharging the power source.

18. The frame of claim 1, further comprising a couch (800) connected to the frame, said couch comprising at least a first couch leg (810).

19. The frame of claim 1, further comprising a dinette (900) connected to the frame, said dinette comprising at least a first dinette bench (910) and a dinette table (930).

20. A modular system for converting at least a portion of a trailer (5) to a living quarters, said system comprising:

at least one frame (100) comprising a plurality of rigid members;

at least one cargo control track (200) comprising at least one receiving member receptacle (210);

at least one attachment mechanism (140) directly connected to at least one rigid member of the plurality of rigid members and configured to connect the at least one frame to the at least one cargo control track at the at least one receiving member receptacle; and at least one living quarters module selected from the group consisting of a sink module, a storage cabinet module, a bed module, a stove module, a toilet module, a shower module, a combined stove and sink module, a combined toilet and shower module, a seating module, and a dinette module; and wherein each living quarters module is connected to one of the at least one frame.

* * * * *